(No Model.)
D. D. WHITNEY.
WHIFFLETREE CONNECTION.
No. 404,371. Patented May 28, 1889.
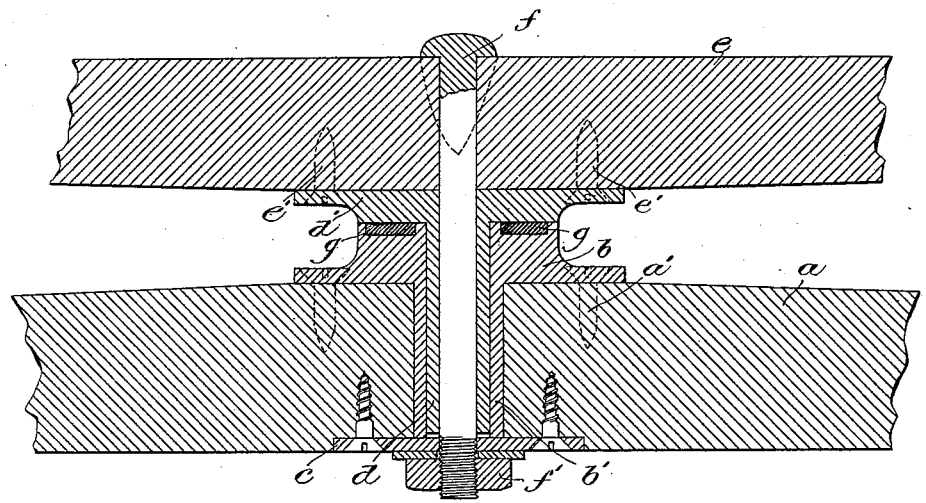
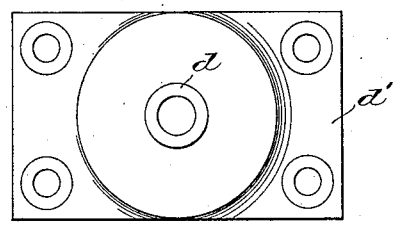
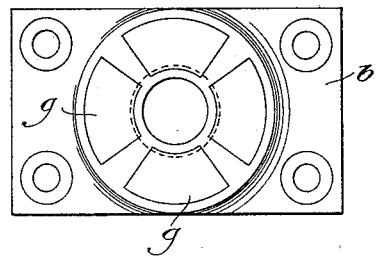
Witnesses.
Inventor.
Daniel D. Whitney.
by Crosby & Gregory
Attys.

UNITED STATES PATENT OFFICE.

DANIEL D. WHITNEY, OF CORNWALL, NEW YORK, ASSIGNOR TO THE WHITNEY COUPLING COMPANY, OF WHITINSVILLE, MASSACHUSETTS.

WHIFFLETREE-CONNECTION.

SPECIFICATION forming part of Letters Patent No. 404,371, dated May 28, 1889.

Application filed January 19, 1889. Serial No. 296,860. (No model.)

*To all whom it may concern:*

Be it known that I, DANIEL D. WHITNEY, of Cornwall, county of Orange, State of New York, have invented an Improvement in Whiffletree-Connections, of which the following description, in connection with the accompanying drawings, is a specification, like letters on the drawings representing like parts.

This invention has for its object to improve the construction of whiffletree-connections, whereby the same may be made more serviceable; and it consists in certain details of construction to be hereinafter set forth.

Figure 1 shows in vertical longitudinal section the central portion of a whiffletree and cross-bar provided with the connection embodying my invention; Fig. 2, an under side view of the upper bearing or chafer plate and its sleeve, and Fig. 3 a top view of the lower bearing or chafer plate.

The cross-bar $a$ of a pair of shafts (not shown) has secured to its upper side, as by screws $a'$, the lower bearing or chafer plate $b$, said plate having a bushing, $b'$, which is fitted into or extends down through a hole in the cross-bar, and preferably at the lower end abuts against a plate, $c$, attached to the under side of the cross-bar.

The bushing $b'$ receives within it a sleeve, $d$, projecting from the upper bearing or chafer plate $d'$, secured to the under side of the whiffletree $e$ by screws $e'$. Preferably the sleeve $d$ will extend down into the bushing $b'$ nearly to the plate $c$. A retaining-bolt, $f$, inserted, preferably, from the upper side of the whiffletree, passes down through the sleeve $d$ and through a hole in the plate $c$, and receives upon its end a suitable washer and nut, $f'$. The upper or contacting surface of the lower bearing or chafer plate, $b$, is provided with one or more recesses, $g$, which are filled with graphite or other anti-friction material to reduce to a minimum the friction between the plates.

I am aware that it is common to secure to the under side of a cross-bar a plate provided with a tube extending upward through the whiffletree and receiving within it a bolt; but in such construction it has been found that the tube is liable to fracture at a point midway between the cross-bar and whiffletree.

In my improved construction the strain is brought to bear upon the sleeve at a point where it is best adapted to withstand it—viz., at its junction with the bearing or chafer plate. The sleeve $d$ also has a metallic bearing throughout its entire length, or nearly so, in the bushing $b'$ of the bearing or chafer plate $b$, thus reducing the wear and consequent objectionable rattle to a minimum.

I am aware that fifth-wheels having anti-friction bearing-surfaces are in use. Therefore I do not herein broadly claim a bearing-plate having an anti-friction bearing-surface.

I claim—

1. In a whiffletree-connection, a bearing or chafer plate, $d'$, adapted to be secured to the whiffletree and having a sleeve extended downwardly into or through the cross-bar, and the retaining-bolt $f$ within it, combined with a companion bearing or chafer plate, $b$, secured to the cross-bar and having a bushing, which also extends down into or through the said cross-bar and receives within it the said sleeve, substantially as described.

2. In a whiffletree-connection, the combination, with the protected retaining-bolt $f$, of two bearing or chafer plates located between a cross-bar and whiffletree, one of which plates has an anti-friction bearing-surface, or substantially so, substantially as described.

In testimony whereof I have signed my name to this specification in the presence of two subscribing witnesses.

DANIEL D. WHITNEY.

Witnesses:
JAMES EMSLIE, Jr.,
RICHARD L. EMSLIE.